(12) United States Patent
Sun et al.

(10) Patent No.: US 8,279,835 B2
(45) Date of Patent: Oct. 2, 2012

(54) METHOD TO FACILITATE USER EQUIPMENT HANDOFF WITHIN A PACKET DATA COMMUNICATION SYSTEM

(75) Inventors: Li-Hsiang Sun, San Diego, CA (US); Ki-Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 354 days.

(21) Appl. No.: 12/764,030

(22) Filed: Apr. 20, 2010

(65) Prior Publication Data

US 2010/0265915 A1 Oct. 21, 2010

Related U.S. Application Data

(60) Provisional application No. 61/171,401, filed on Apr. 21, 2009, provisional application No. 61/172,670, filed on Apr. 24, 2009.

(51) Int. Cl.
*H04W 4/00* (2009.01)
(52) U.S. Cl. ........................................................ 370/331
(58) Field of Classification Search ........................ None
See application file for complete search history.

(56) References Cited

U.S. PATENT DOCUMENTS

| | | | |
|---|---|---|---|
| 2002/0141360 A1* | 10/2002 | Baba et al. | 370/331 |
| 2007/0041346 A1 | 2/2007 | Bae et al. | |
| 2010/0157943 A1* | 6/2010 | Horn | 370/331 |
| 2012/0063419 A1* | 3/2012 | Zhao et al. | 370/331 |

FOREIGN PATENT DOCUMENTS

| | | |
|---|---|---|
| WO | 2008/055169 | 5/2008 |
| WO | 2009/021214 | 2/2009 |

OTHER PUBLICATIONS

L. Bajzik et al., "Impact of Intra-LTE Handover with Forwarding on the User Connections," 16th IST Mobile and Wireless Communications Summit, Jul. 2007.

* cited by examiner

*Primary Examiner* — Kwang B Yao
*Assistant Examiner* — Tung Q Tran
(74) *Attorney, Agent, or Firm* — Lee, Hong, Degerman, Kang & Waimey

(57) ABSTRACT

A method to facilitate user equipment (UE) handoff within a packet data communication system includes receiving at the Evolved NodeB (eNB) via a serving relay node an indication that the UE will undergo a handoff from the serving relay node to a target node; receiving at the eNB first packet data having a first payload and a first Internet protocol (IP) header identifying an address of the eNB; extracting, at the eNB, the first payload from the first packet data to form a first packet data unit (PDU) including the extracted first payload and a second IP header identifying the address of the eNB and an address of the target node; and transmitting, from the eNB to the target node, the first PDU to permit the target node to transmit the first payload of the first PDU to the UE, the target node being identified using the second IP header.

23 Claims, 12 Drawing Sheets

METHOD TO FACILITATE USER EQUIPMENT HANDOFF WITHIN A PACKET DATA COMMUNICATION SYSTEM

CROSS-REFERENCE TO RELATED APPLICATIONS

Pursuant to 35 U.S.C. §119(e), this application claims the benefit of earlier filing date and right of priority to U.S. Provisional Application Nos. 61/171,401 and 61/172,670 filed on Apr. 21, 2009 and Apr. 24, 2009, respectively, the contents of which are incorporated by reference herein in their entirety.

FIELD OF THE INVENTION

The present invention relates to wireless communications, and in particular, to wireless communication techniques.

DESCRIPTION OF THE RELATED ART

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

SUMMARY

In accordance with an embodiment, a method to facilitate user equipment (UE) handoff within a packet data communication system includes receiving at the Evolved NodeB (eNB) via a serving relay node an indication that the UE will undergo a handoff from the serving relay node to a target node. The method includes receiving at the eNB first packet data for the UE, the first packet data having a first Internet protocol (IP) header and a first payload, wherein the first IP header identifies an address of the eNB, and extracting, at the eNB, the first payload from the first packet data to form a first packet data unit (PDU). The first PDU may include a second IP header and the extracted first payload, such that the second IP header identifies the address of the eNB and an address of the target node. Another operation includes transmitting, from the eNB to the target node, the first PDU to permit the target node to transmit the first payload of the first PDU to the UE, the target node being identified based upon the address of the target node identified by the second IP header.

In accordance with another embodiment, a method to facilitate user equipment (UE) handoff within a packet data communication system includes receiving, at the eNB via a serving relay node, an indication that the UE will undergo a handoff from the serving relay node to a target node and receiving, at the eNB, first packet data for the UE, the first packet data comprising a first Internet protocol (IP) header and a first payload, such that the first IP header identifies an address of the eNB. Further operations include extracting, at the eNB, the first payload from the first packet data to form a first packet data unit (PDU), wherein the first PDU comprises the extracted first payload, and transmitting, from the eNB to the target node, the first PDU to permit the target node to transmit the first payload of the first PDU to the UE. In addition, the method includes identifying second packet data for the UE that has been received at the eNB, the second packet data being received at the eNB after the first packet data is received at the eNB, and which the second packet data is received during a time period when the UE is undergoing the handoff to the target node, extracting, at the eNB, the second payload from the second packet data to form a second PDU, wherein the second PDU comprises the extracted second payload from the second packet data, and extracting, at the eNB, the second payload from the second packet data to form a third PDU, wherein the third PDU comprises the extracted second payload from second packet data. In further operations, the method includes transmitting the second PDU to the target node via a lower protocol layer and transmitting the third PDU to the serving relay node via the lower protocol layer.

These and other embodiments will also become readily apparent to those skilled in the art from the following detailed description of the embodiments having reference to the attached figures, the present disclosure not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
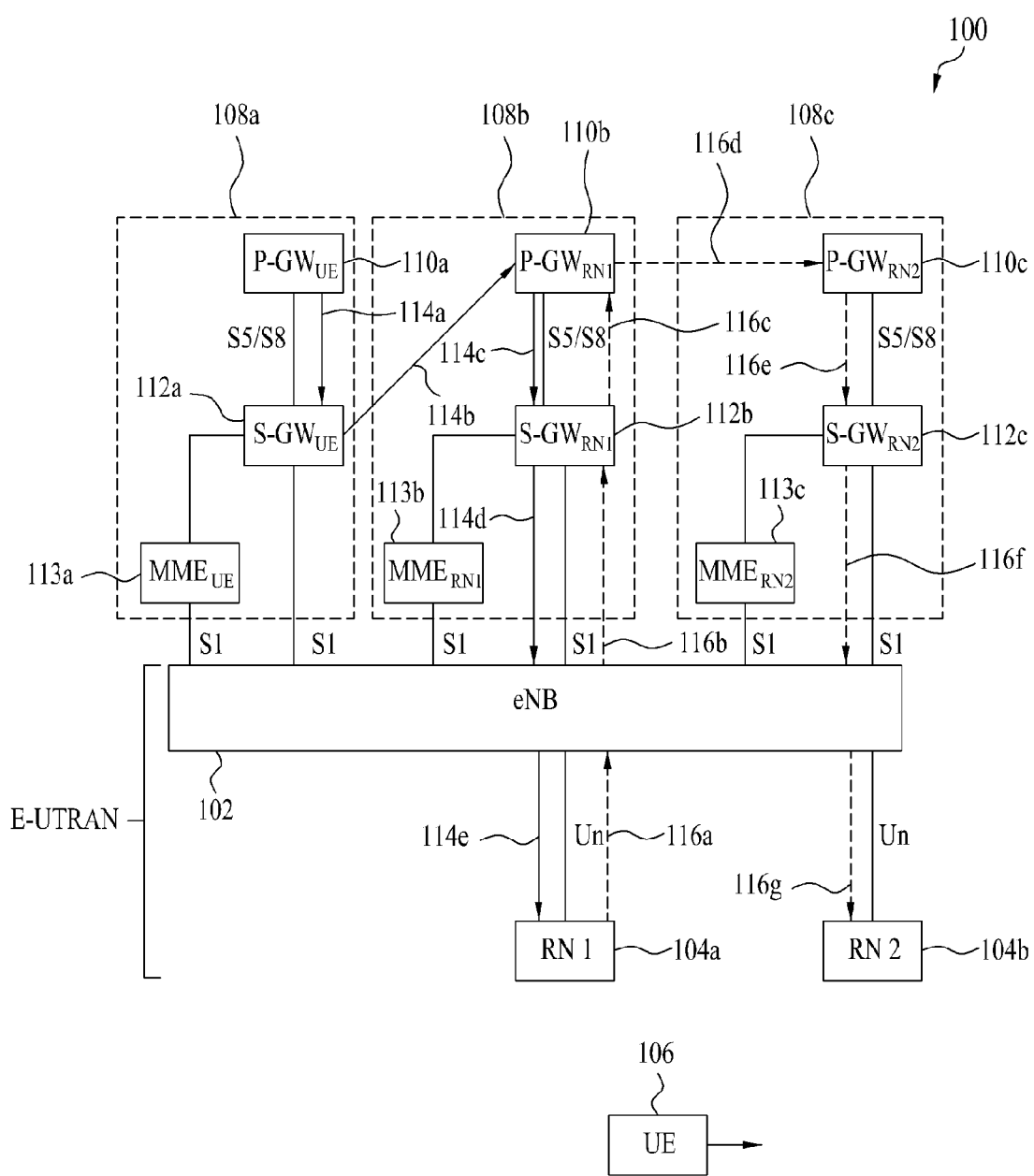
FIG. 1 is a block diagram illustrating network structure of an evolved universal mobile telecommunication system (E-UMTS) configured in accordance with various embodiments of the present invention.

FIG. 1 is a block diagram illustrating network structure 100 of an evolved universal mobile telecommunication system (E-UMTS). The E-UMTS may be also referred to as an LTE system. The communication network is widely deployed to provide a variety of communication services such as voice and packet data.

As shown in FIG. 1, the network structure 100 includes an evolved UMTS terrestrial radio access network (E-UTRAN) and an Evolved Packet Core (EPC) and at least one user equipment (UE). The E-UTRAN may include at least one evolved NodeB (eNB) 102, relay nodes (RNs) 104a and 104b, and at least one UE 106 may be located in one cell. One or more E-UTRAN mobility management entity (MME)/system architecture evolution (SAE) gateways, such as MME/SAE gateways 108a, 108b, and 108c may be positioned at the end of the network and connected to an external network. As used herein, "downlink" (DL) refers to communication from eNB 102 to UE 106, and "uplink" (UL) refers to communication from the UE 106 to an eNB 102. UE 106 refers to communication equipment carried by a user and may be also be referred to as a mobile station (MS), a user terminal (UT), a subscriber station (SS) or a wireless device.

The UE 106, eNB 102, and RNs 104a and 104b each constitute a node. For example, the RN1 104a and RN2 104b can each be Type 1 relay nodes.

The eNB 102, which can also be referred to as a donor eNB, provides end points of a user plane and a control plane to the UE 106. MME/SAE gateways 108a, 108b, and 108c provide an end point of a session and mobility management function for UE 106. The eNB 102 may be connected to each MME/SAE gateway via an S1 interface.

The MME/SAE gateway 108a includes a UE MME (MME$_{UE}$) 113a, a UE signaling gateway (SGW$_{UE}$) 112a and a UE packet data network gateway (PGW$_{UE}$) 110a. The MME/SAE gateway 108b includes an RN1 MME (MME$_{RN1}$) 113b, an RN1 signaling gateway (SGW$_{RN1}$) 112b and an RN1 packet data network gateway (PGW$_{RN1}$) 110b. The MME/SAE gateway 108c includes an RN2 MME (MME$_{RN2}$) 113c, an RN2 signaling gateway (SGW$_{RN2}$) 112c and an RN2 packet data network gateway (PGW$_{RN2}$) 110c.

The UE 106 can communicate with the RN1 104a and RN2 104b via a Uu interface. The Uu interface may be configured such that the control plane protocols and user plane protocols are be terminated in a relay node, such as RN1 104a or RN 2 104b.

The RN1 104a and the RN2 104b can communicate with the eNB 102 via a suitable interface. The Un user plane can include a medium access control (MAC), radio link control (RLC), and packet data convergence protocol (PDCP) layers, which may or may not be identical to the MAC, RLC, and PDCP layers of the Uu interface.

The eNB 102 can communicate with the SGW$_{UE}$ 112a, SGW$_{RN1}$ 112b, and the SGW$_{RN2}$ 112c via an S1-U interface. The SGW$_{UE}$ 112a, SGW$_{RN1}$ 112b, and the SGW$_{RN2}$ 112c can communicate with the PGW$_{UE}$ 110a, PGW$_{RN1}$ 110b, and the PGW$_{RN2}$ 110c, respectively, via an S5/S8 interface.

The eNB 102 is generally a fixed station that communicates with a UE 106, and may also be referred to as a base station (BS) or an access point. One eNB 102 may be deployed per cell. An interface for transmitting user traffic or control traffic may be used between eNB 102. In some embodiments, the eNB 102 may be configured in a manner similar to the various eNBs disclosed herein (e.g., eNB 118).

The MMEs 113a, 113b and 113c provide various functions including distribution of paging messages to eNB 102, security control, idle state mobility control, SAE bearer control, and ciphering and integrity protection of non-access stratum (NAS) signaling. The SAE gateway host provides assorted functions including termination of U-plane packets for paging reasons, and switching of the U-plane to support UE mobility. For clarity MME/SAE gateway will sometimes be referred to herein simply as a "gateway," but it is understood that this entity includes both an MME and an SAE gateway.

A plurality of nodes may be connected between eNB 102 and gateways 108a, 108b, and 108c via the S1 interface. The eNB 102 may be connected to other eNBs via an X2 interface and neighboring eNBs may have a meshed network structure that has the X2 interface.

Figure 2A:
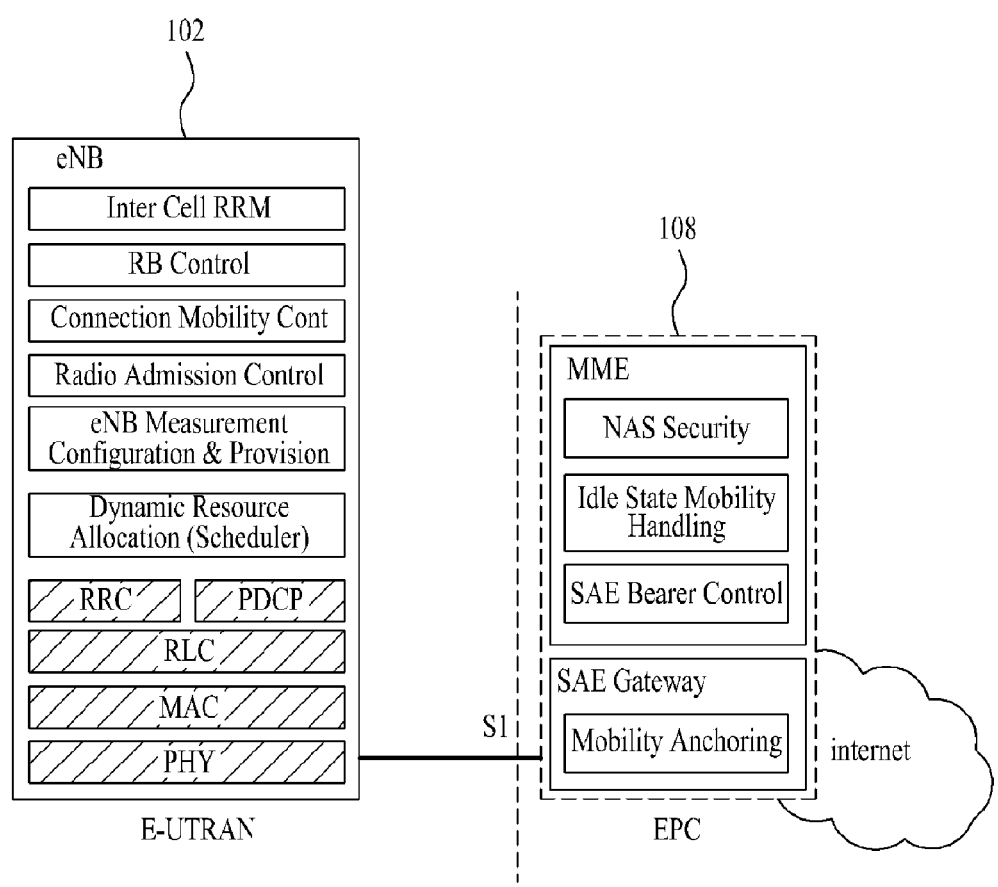
FIG. 2(a) is a block diagram depicting architecture of an E-UTRAN and EPC.

FIG. 2(a) is a block diagram depicting architecture of a typical E-UTRAN and a typical EPC. The MME/SAE gateway 108 in FIG. 2(a) corresponds to gateways 108a, 108b and 108c in FIG. 1.

As illustrated, eNB 102 may perform functions of selection for gateway 108, routing toward the gateway during a Radio Resource Control (RRC) activation, scheduling and transmitting of paging messages, scheduling and transmitting of Broadcast Channel (BCCH) information, dynamic allocation of resources to UEs 106 in both uplink and downlink, configuration and provisioning of eNB measurements, radio bearer control, radio admission control (RAC), and connection mobility control in LTE_ACTIVE state. In the EPC, and as noted above, gateway 108 may perform functions of paging origination, LTE-IDLE state management, ciphering of the user plane, System Architecture Evolution (SAE) bearer control, and ciphering and integrity protection of Non-Access Stratum (NAS) signaling.

Figure 2B:
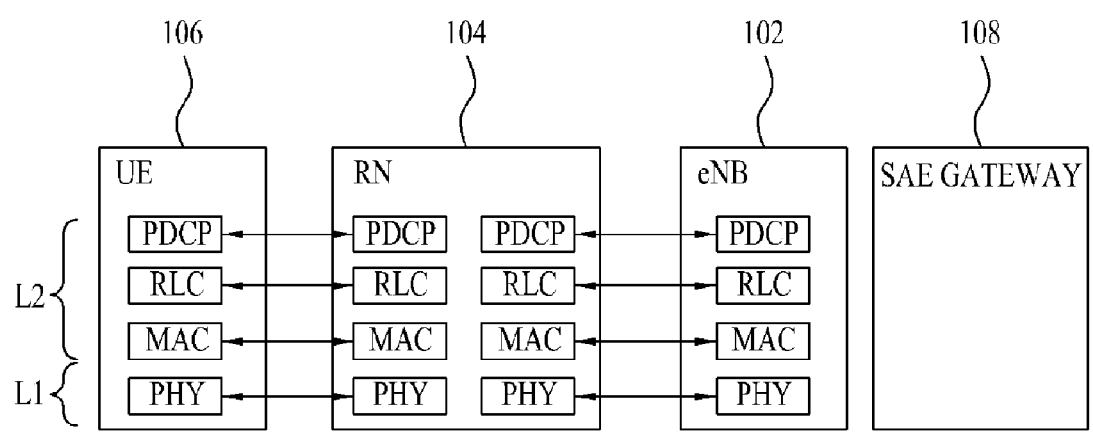
FIG. 2(b) is a block diagram depicting the user-plane protocol stack for the E-UMTS.
Figure 2C:
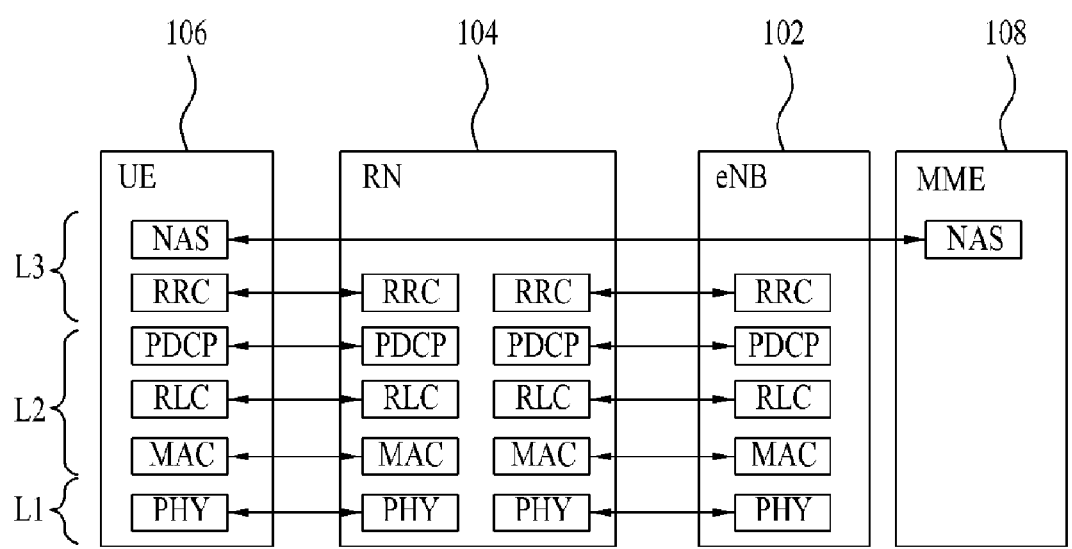
FIG. 2(c) is a block diagram depicting the control-plane protocol stack for the E-UMTS.

FIGS. 2(b) and 2(c) are block diagrams depicting a user-plane protocol and a control-plane protocol stack for the E-UMTS. As illustrated, the protocol layers may be divided into a first layer (L1), a second layer (L2) and a third layer (L3) based upon the three lower layers of an open system interconnection (OSI) standard model.

The physical layer (PHY), that is, the first layer (L1), provides an information transmission service to an upper layer by using a physical channel. The physical layer is connected with a MAC layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to an RLC layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in the eNB 102 on the network side) may perform functions such as Scheduling, Automatic Repeat Request (ARQ), and hybrid automatic repeat request (HARQ). The PDCP layer (terminated in eNB 102 on the network side) may perform the user plane functions such as header compression, integrity protection, and ciphering.

As illustrated in FIG. 2(c), the RLC and MAC layers (terminated in an eNB 102 on the network side) perform the same functions as for the control plane. As illustrated, the RRC layer (terminated in an eNB 102 on the network side) may perform functions such as broadcasting, paging, RRC connection management, Radio Bearer (RB) control, mobility functions, and UE measurement reporting and controlling. The NAS control protocol, which is terminated in the MME of gateways 108a, 108b, and 108c on the network side, may perform functions such as a SAE bearer management, authentication, LTE_IDLE mobility handling, paging origination in LTE_IDLE, and security control for the signaling between the gateways and UE 106.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 106 may receive broadcasts of system information and paging information while the UE 106 specifies a Discontinuous Reception (DRX) configured by NAS, and the UE 106 has been allocated an identification (ID) which uniquely identifies the UE in a tracking area. Also, in RRC-IDLE state, no RRC context is stored in the eNB 102.

In RRC_CONNECTED state, the UE 106 has an E-UTRAN RRC connection and a context in the E-UTRAN, such that transmitting and/or receiving data to/from the network (eNB) becomes possible. Also, the UE 106 can report channel quality information and feedback information to the eNB 102.

In RRC_CONNECTED state, the E-UTRAN knows the cell to which the UE 106 belongs. Therefore, the network can transmit and/or receive data to/from UE 106, the network can control mobility (handover) of the UE 106, and the network can perform cell measurements for a neighboring cell.

In RRC_IDLE mode, the UE 106 specifies the paging DRX (Discontinuous Reception) cycle. Specifically, the UE 106 monitors a paging signal at a specific paging occasion of every UE specific paging DRX cycle.

An exemplary handoff (HO) operation in the network structure 100 will be discussed.

In the network structure 100, RN1 104a is the S1-U tunnel endpoint. Accordingly, when the UE 106 establishes a connection, e.g., a call or a data session, via the source relay node, i.e., RN1 104a, packet data is received at the RN1 104a from the $PGW_{UE}$ 110a by way of the path indicated by arrows 114a through 114e. The packet data is then provided to the UE 106 via the Uu interface.

As shown in FIG. 1, when the UE 106 moves away from the RN1 104a and toward the RN2 104b, a handoff is performed by the communication network 100 to maintain the connection. However, if the handoff is performed prior to relocating the S1-U tunnel endpoint from the RN1 104a to the RN2 104b, the delivery of the packet data from the $PGW_{UE}$ 110a to the RN2 104b can be delayed.

For example, after a handoff has been performed such that the UE 106 maintains the connection with the RN2 104b via the Uu interface, the packet data from $PGW_{UE}$ 110a arriving at the RN1 104a via the path indicated by arrows 114a through 114e must be provided to the RN2 104b via the path indicated by arrows 116a through 116g. As such, the packet data from the $PGW_{UE}$ 110a may be significantly delayed in arriving at the RN2 104b.

For example, the transmission of the packet data from the eNB 102 to the RN1 104a as indicated by arrow 114e and the return transmission of the packet data from the RN1 104a to the eNB 102 as indicated by arrow 116a can introduce a delay of approximately 16 milliseconds. Moreover, additional delays may be introduced due to processing delays above the MAC layer and the delay to the relay link transmission opportunity for in-band relay.

With further respect to FIG. 1, when relays, such as RN1 104a and RN2 104b, are used in communication with the eNB 102 via a Un radio interface, latencies can result as a consequence of the radio interface domain.

Figure 3:
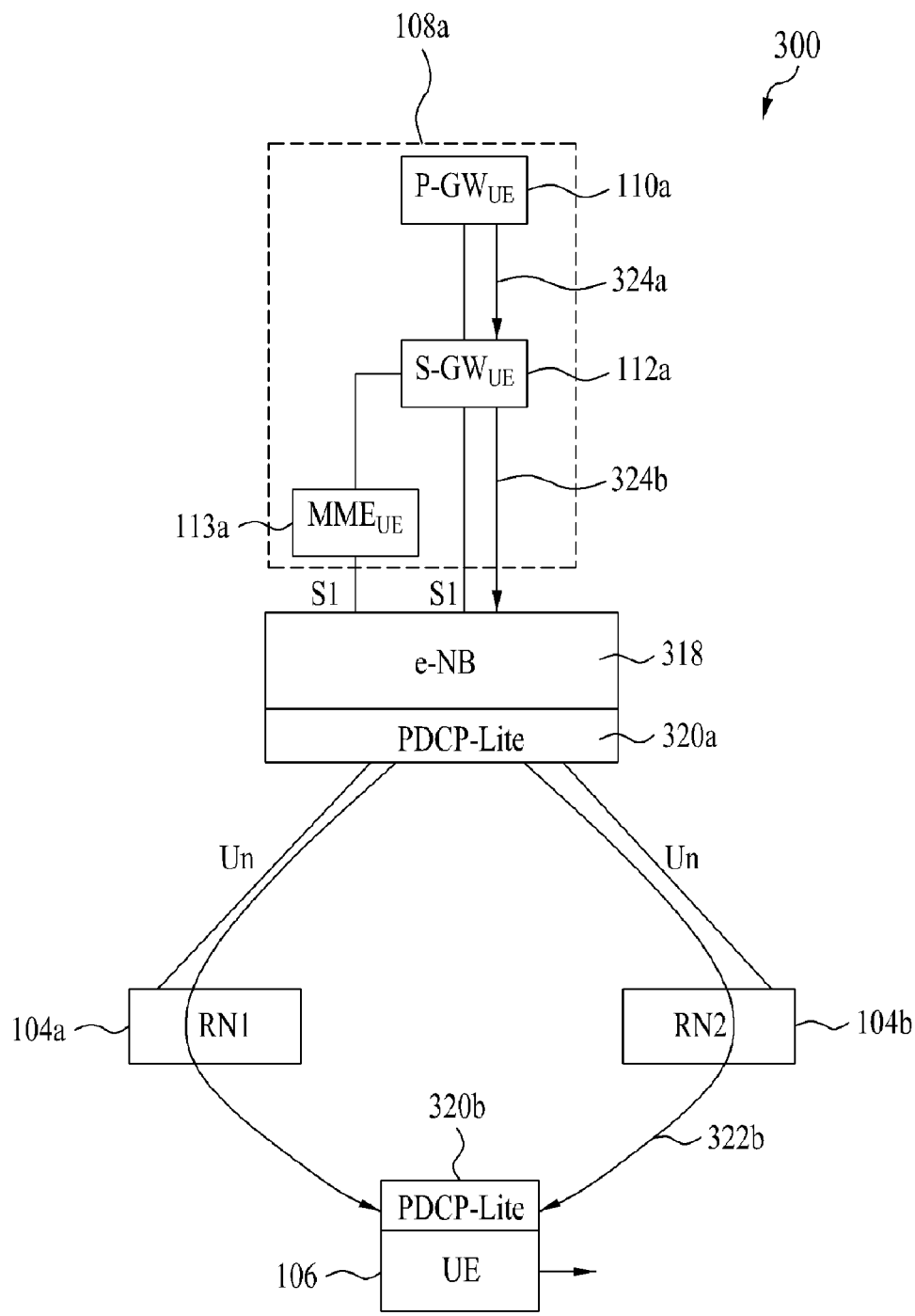
FIG. 3 shows a communication system in accordance with various embodiments of the invention.

FIG. 3 shows a communication system 300 in accordance with various embodiments of the invention.

As shown in FIG. 3, the communication system 300 includes an Evolved NodeB (eNB) 318, RNs 104a and 104b, UE 106, and MME/SAE gateway 108a, which includes $MME_{UE}$ 113a, $SGW_{UE}$ 112a, and $PGW_{UE}$ 110a.

As also shown in FIG. 3, the RN1 104a and the RN2 104b can communicate with the eNB 318 via a Un or other radio protocol interface. The eNB 318 can communicate to the $SGW_{UE}$ 112a and the $MME_{UE}$ 113a via an S1 interface, and the $SGW_{UE}$ 112a can communicate with the $PGW_{UE}$ 110a via an S5/S8 interface.

The eNB 318, which can also be referred to as a donor eNB, can communicate with the UE 106 via either the RN1 104a or 104b using a Packet Data Convergence Protocol Lite (PDCP-Lite), which is discussed in detail below. In the communication system 300, the eNB 318 is the S1-U tunnel endpoint for the UE 106. In one embodiment, handoff requests are processed at the eNB 318.

Figure 4:
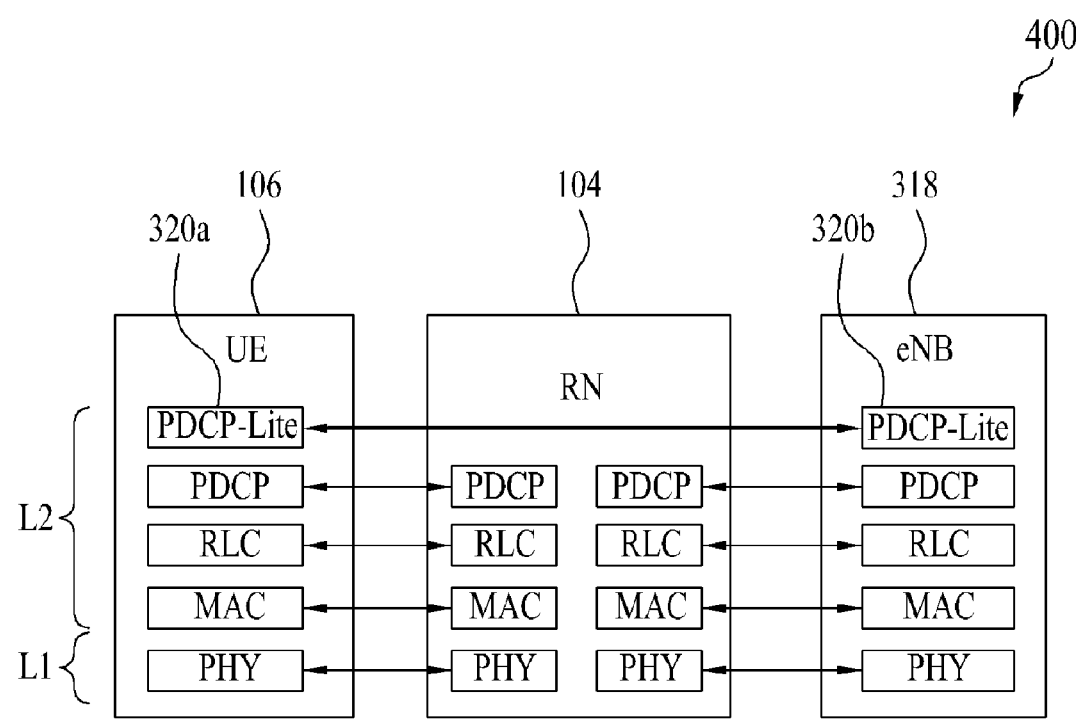
FIG. 4 depicts a block diagram depicting a user plane protocol (U-plane) for a communication system in accordance with various embodiments of the invention.

FIG. 4 depicts a block diagram depicting a user plane protocol (U-plane) 400 for the communication system 300 in accordance with various embodiments of the invention. As shown in FIG. 4, the protocol stacks of the UE 106, RN 104, and the eNB 318 each include a PHY layer in Layer 1 (L1), and MAC, RLC, and PDCP layers in Layer 2 (L2). The RN 104 in FIG. 4 corresponds to the RN1 104a and RN 104b in FIGS. 1 and 3.

As further shown in FIG. 4, the UE 106 and the eNB 318 include in Layer 2 above the PDCP layer, a PDCP-Lite layer 320a and a PDCP-Lite layer 320b. The PDCP-Lite layers 320a and 320b are configured to communicate with one another across the RN 104 using a PDCP-Lite protocol, which is an end-to-end protocol.

Figure 5:
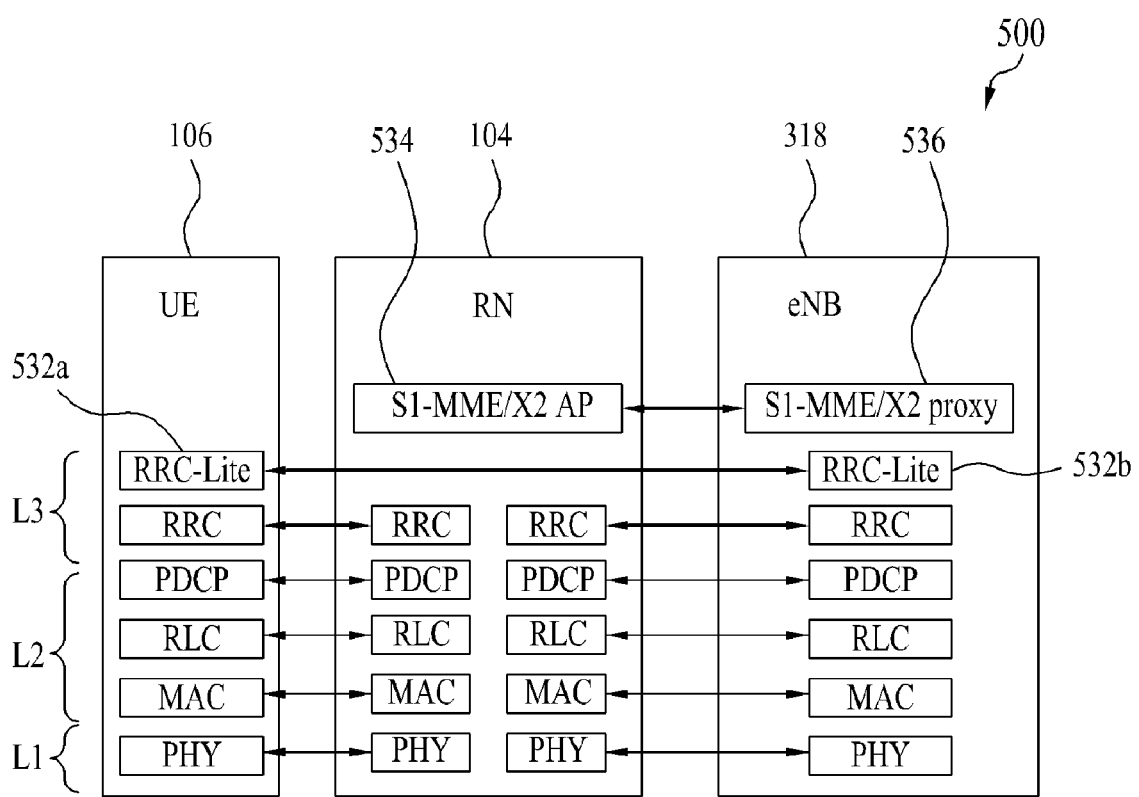
FIG. 5 depicts a block diagram depicting a control plane protocol (C-plane) for the communication system in accordance with various embodiments of the invention.

FIG. 5 depicts a block diagram depicting a control plane protocol (C-plane) 500 for the communication system 300 in accordance with various embodiments of the invention. As shown in FIG. 5, the protocol stacks of the UE 106, RN 104, and the eNB 318 each include a PHY layer in Layer 1 (L1), MAC, RLC, and PDCP layers in Layer 2 (L2), and an RRC layer in Layer 3 (L3). As further shown in FIG. 5, the UE 106 and the eNB 318 include in Layer 3 above the RRC layer, RRC-Lite layers 532a and 532b. The RRC-Lite layers 532a and 532b are configured to communicate with one another across the RN 104 using an RRC-Lite protocol, which is an end-to-end protocol.

As also shown in FIG. 5, the RN 104 includes an S1-MME/X2 Application Protocol (AP) layer 534 above the RRC layer and the eNB 318 includes an S1-MME/X2 proxy layer 536 above the RRC-Lite layer.

The RRC-Lite protocol can be used to configure the PDCP-Lite protocol discussed above. As further shown in FIG. 5, the S1-MME/X2 AP layer 534 is configured to communicate with the S1-MME/X2 proxy layer 536.

In one embodiment, the eNB 318 functions as an S1-MME proxy. More specifically, from the perspective of the MME 113a, the UE 106 operates as if directly attached to the eNB 318. Therefore, the eNB 318 is the S1-U tunnel endpoint for UE 106, for example. The eNB 318 also functions as an X2 proxy, such that the eNB 318 is able to process handoff requests.

The S1-MME/X2 AP layer 534 and the S1-MME/X2 proxy layer 536 communicate using a pseudo S1-MME protocol and a pseudo X2 protocol. In one embodiment, a new RRC message information element (IE), such as "S1/X2_Info," can be used to transport S1-MME and X2 messages. For example, the eNB 318 can use the S1/X2_Info message IE to forward the S1-MME and X2 messages, such that the S1-MME and X2 messages appear to be generated by the eNB 318. In another embodiment, the protocol data can be carried by the GPRS Tunnelling Protocol (GTP) or the Stream Control Transmission Protocol (SCTP), and transported by either user or control plane protocols between eNB and RN.

A pseudo S1-U interface is a relay link radio bearer between the eNB 318 and each of RN 104a and 104b. In one embodiment, the pseudo S1-U interface is set up by the eNB 318 after the S1-U interface is setup between the eNB 318 and the SGW$_{UE}$ 112a.

A new RRC message IE, such as "RRC-Lite_Info," can be used to transport RRC-Lite messages between the UE 106 and the RN 104a and RN 104b. The RRC-Lite_Info message IE can also be used to transport RRC-Lite messages between the eNB 318 and each of RN 104a and RN 104b. The RN 104a or 104b can forward the RRC-Lite_Info message IE to the UE 106 or the eNB 318 transparently.

In the C-plane 500, non-access stratum (NAS) messages can be transported using an RRC message that includes a typical message IE, such as a "DedicatedInfoNas" message IE. For example, the RN 104a or 104b and the eNB 318 can forward the typical message IE transparently.

An example of a relay link radio bearer setup procedure in accordance with various embodiments of the invention will now be discussed.

The eNB 318 can initiate the relay link radio bearer setup procedure by transmitting an RRCConnectionReconfiguration message to the RN 104a or 104b to set up a relay link radio bearer, that is, the pseudo S1-U. For example, the RRC-ConnectionReconfiguration message may contain message IEs, such as S1_info, DedicatedInfoNasList, and RRCLite_info. The RRCLite_info message IE can contain an RRC-Lite RRCConnectionReconfiguration message.

The RN 104a or 104b can determine the particular UE, such as UE 106, for which the RRCConnectionReconfiguration message is intended using the S1_Info message IE. The RN 104a or 104b can then forward the RRCConnectionReconfiguration message to the intended UE, such as the UE 106, to establish an access link radio bearer. In one embodiment, the DedicatedinfoNASList message IEs and the RRCLite_info message IE are forwarded by the RN 104a or 104b transparently.

After receiving the RRCConnectionReconfiguration message from the RN 104a or the RN 104b, the UE 106 can use the RRCConnectionReconfiguration message to configure the access link radio bearer. Moreover, the UE 106 can use the RRCConnectionReconfiguration message to configure the RRC-Lite radio bearer using the RRC-Lite RRCConnectionReconfiguration message included in the RRCConnectionReconfiguration message. The UE 106 associates the new RRC-Lite radio bearer with the new access link radio bearer.

The UE 106 can then transmit an RRCConnectionReconfigurationComplete message for the access link radio bearer. For example, the RRCConnectionReconfigurationComplete message can include an RRCLite_info message IE indicating that configuration of the RRC-Lite radio bearer is complete.

The RN 104a or 104b can then transmit an RRCConnectionReconfigurationComplete message for the relay link radio bearer. The RN 104a or 104b can forward the RRCLite_info message IE, transparently, to the eNB 318, for example. The RN 104a or 104b can then associate the access link radio bearer with the relay link radio bearer.

An exemplary handoff procedure will now be discussed in accordance with various embodiments of the invention.

With reference to FIG. 3, the UE 106 can establish a connection, e.g., a call or a data session, with the eNB 318 via the RN1 104a. As the UE 106 moves away from the RN1 104 and toward the RN2 104b, the RN1 104a can make an "HO decision," that is, the RN1 104a can determine whether to handoff the UE 106, based on a measurement report from the UE 106 and radio resource management (RRM) information, for example. The RN1 104a can issue an "HO request" message to the appropriate target node, that is, to the RN2 104b to prepare the target node side for the HO operation.

During the handoff procedure, first packet data from the PGW$_{UE}$ 110a intended for the UE 106 can be provided to the SGW$_{UE}$ 112a as indicated by the arrow 324a and received at the eNB 318 from the SGW$_{UE}$ 112a as indicated by the arrow 324b. The first packet data from the SGW$_{UE}$ 112a can include a first Internet protocol (IP) header identifying the address of the eNB 318 and a first payload.

After receiving the first packet data, the eNB 318 can extract the first payload and can use the extracted first payload to form a first packet data unit (PDU) that includes a second IP header identifying the address of the eNB 318 and an address of the target node, that is the RN2 104b.

The eNB 318 can then transmit the first PDU to the target node, that is, the RN2 104b, which can then provide the first PDU to the UE 106, as indicated by arrow 322b. The target node can be identified based upon the address of the target node identified by the second IP header.

Therefore, after the handoff is completed, the packet data from the PGW$_{UE}$ 110a intended for the UE 106 is received directly at the RN2 104b by providing the packet data from the PGW$_{UE}$ 110a to the SGW$_{UE}$ 112a as indicated by the arrow 324a and then providing the packet data to the eNB 318 as indicated by arrow 324b. The packet data is then provided to the UE 106 via the RN2 104b as indicated by the arrow 322b.

Once the handoff of the UE 106 to the RN2 104b is completed, the UE 106 can report missing PDCP-Lite service data units (SDUs) to the eNB 318 and the eNB 318 can forward PDCP-Lite packet data units (PDUs) directly to the RN2 104b. It should be understood that the PDCP-Lite protocol can be configured to function as a normal PDCP protocol when the UE 106 is handed off to a different eNB instead of the RN2 104*b*. Therefore, data can be provided to the UE 106 without the delay discussed above with reference to FIG. 1.

In one embodiment, the PDCP-Lite header compression function may be optionally disabled because eNB 318 does not have an RLC interaction on radio link conditions to the UE 106. In such a case, the header compression can be performed by the PDCP of each link.

When the UE 106 is not handed off to the RN 104*b* and remains in communication with the RN 104*a*, the PDCP-Lite header can be sent periodically. The UE 106 can use the received access link PDCP sequence number (SN) to derive the PDCP-Lite SN.

Under some circumstances, after the UE 106 is handed off from the RN1 104*a* to the RN 104*b* or eNB 318, packet data may continue to be sent to the RN1 104*a* and thus arrive at the RN1 104*a* too late.

For example, in a typical intra-MME/S-GW HO procedure from one eNB, i.e., a source eNB, to another eNB, i.e., a target eNB, the source eNB performs "Data Forwarding" to the target eNB after sending the SN STATUS TRANSFER message to the eNB via an X2 interface. Data, however, may continue to be delivered to the source eNB during the "transition period" occurring between the transmission of the "Handover Request" message and "SN Status Transfer" message. Packet data received by the source eNB during this period (also herein referred to as "late packet data"), but which has not yet been delivered to the UE 106 needs to be forwarded to the target eNB. Therefore, "late packet data" refers to packet data that has already arrived at a transmit queue, but not transmitted in time due to a handoff event.

It should be understood that the terms "source node" and "target node" as used herein refer to elements associated with a handoff procedure. For example, with reference to FIG. 1, since the UE 106 is connected to the RN1 104*a* and receiving data from the RN1 104*a*, the serving node of the UE 106 is the RN1 104*a*. As the UE 106 moves closer to another node, such as the eNB 102 or the RN2 104*b*, the target node of the UE 106 is the specific node to which the UE 106 is handed off, such as the eNB 102 or the RN2 104*b*.

Referring back to FIG. 1, the UE 106 can be handed off from the RN1 104*a* under two scenarios. In a first scenario, the UE 106 can be handed off from the RN1 104*a*, i.e., the source node, to the eNB 102, i.e., the target node. In a second scenario, the UE 106 can be handed off from the RN1 104*a*, i.e., the source node, to the RN2 104*b*, i.e., the target node.

Therefore, in both the first and second scenarios, the late packet data queued in the DL transmit queue in the RN1 104*a*, i.e. the source node, should be forwarded to the appropriate target node, that is, to the eNB 102 in the first scenario and the RN2 104*b* in the second scenario. Moreover, the late packet data can be queued in the transmit queue of the UE 106 until the appropriate target node, that is, the eNB 102 in the first scenario and the RN2 104*b* in the second scenario, performs "UL Allocation."

Since the late packet data in the transmit queue is to be forwarded to the target node during the "transition period" and no interface is defined directly between two immediate RNs, the late packet data in RN 104*a* would typically be sent back to the eNB 102 via the Un interface, as indicated by arrow 116*a*, to the appropriate target node, such as RN2 104*b*, as indicated by arrow 116*g*. However, if the late packet data was scheduled in advance so as to be provided directly to the appropriate target node, the late packet data would not undergo the extra latency as a result of being sent back through the eNB 102 via the Un interface and therefore, channel resources in both the DL and UL could be preserved.

Figure 6:
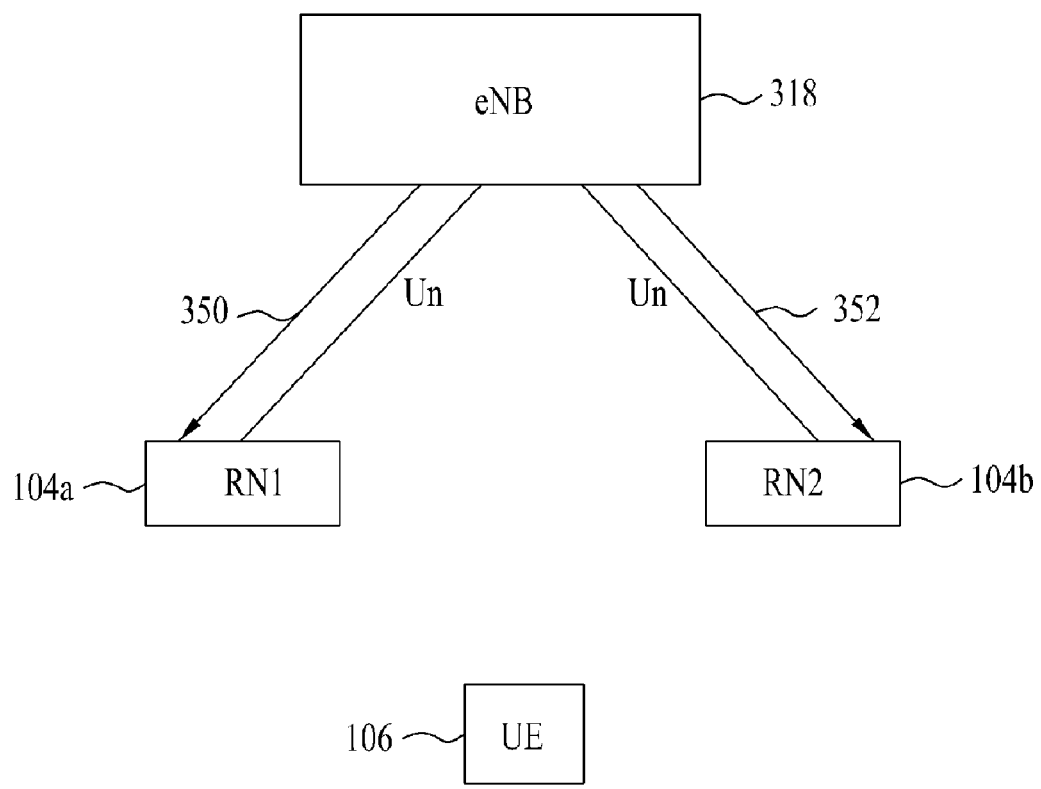
FIG. 6 depicts a block diagram of the communication system in accordance with various embodiments of the invention.
Figure 7:
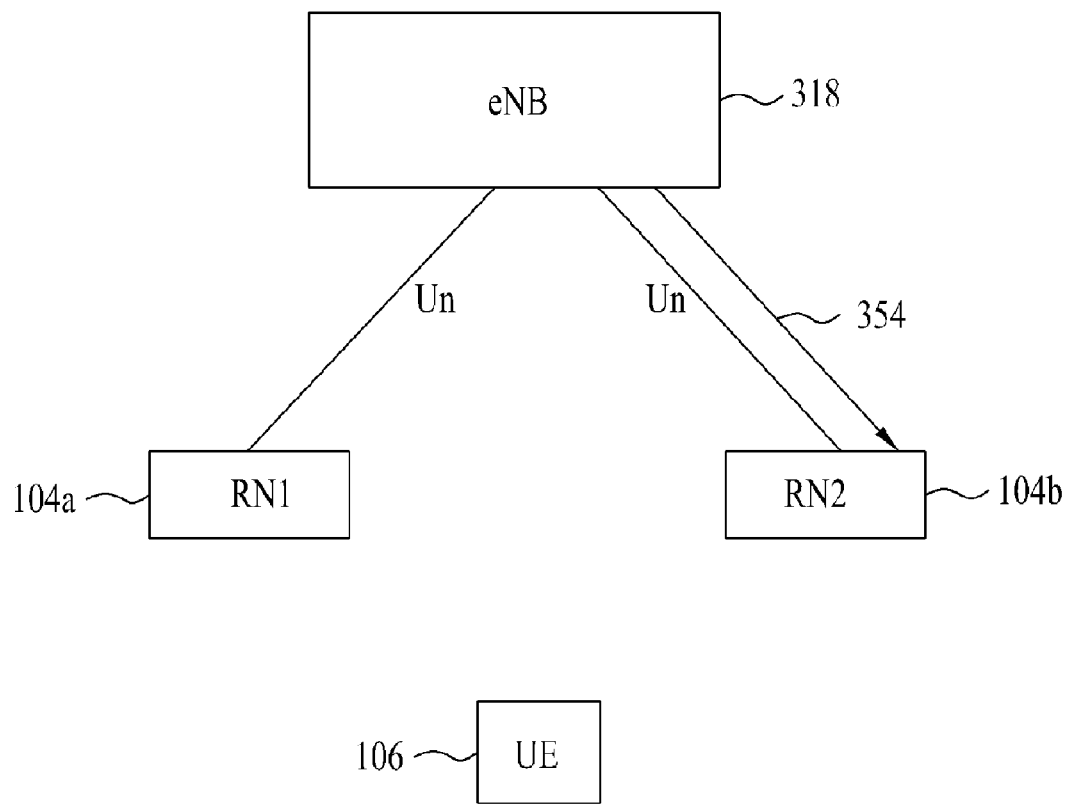
FIG. 7 depicts a block diagram of the communication system in accordance with various embodiments of the invention.

Referring now to FIGS. 6 and 7, before initiating a handoff, the RN1 104*a* makes an "HO decision," that is, determines whether to handoff the UE 106, based on a measurement report from the UE 106 and radio resource management (RRM) information. The RN1 104*a* issues an "HO request" message to the appropriate target node, that is, to the eNB 318 in the first scenario and the RN2 104*b* in the second scenario, to pass the necessary information of the UE 106 to prepare the target node side for the HO operation.

In one embodiment, the eNB 318 can initiate a packet duplication procedure. For example, the packet duplication procedure can be initiated by the eNB 318 in response to receiving a "Packet_Duplication request" message from the source node, that is, RN1 104*a*. As another example, the packet duplication procedure can be initiated by the eNB 318 in response to receiving a "Packet_Duplication request" message from the target node. In such a case, however, the "Packet_Duplication request" message is not necessary if the target node is the eNB 318. As still another example, the eNB 318 can initiate the packet duplication procedure in response to a procedure to perform inspection of the UE 106 X2 signaling.

In one embodiment, the eNB 318 can perform the packet duplication procedure using an actual packet duplication (aPD) procedure. For example, as shown in FIG. 6, the eNB 318 can duplicate the data packets and transmit the data packets in a substantially concurrent manner to multiple destinations, such as the RN1 104*a* and the appropriate target node, as indicated by arrows 350 and 352.

In another embodiment, the eNB 318 can perform the packet duplication procedure using a virtual packet duplication (vPD) procedure. For example, as shown in FIG. 7, the eNB 318 can virtually duplicate the data packets and transmits the data packets only to the appropriate target node, such as RN 104*b*, as a indicated by arrow 354. It is noted that the eNB 318 can properly perform the vPD procedure because the packet duplication procedure is performed after the "Access Control" at the target node is performed. However, if the UE 106 is dropped even after being admitted, the vPD-based eNB 318 may store the data packets transmitted to the appropriate target node for a predetermined period of time and transmit the copies of the data packets to the RN1 104*a*, if necessary.

The serving node, that is, RN 104*a*, can transmit first data packet sequencing data to the eNB 318 relating to latest packet data transmissions from the serving node to the UE 106 for which the UE 106 has not yet received. The first packet sequencing data is also provided to the target node to facilitate packet data transmissions from the target node to the UE 106.

The serving node can further transmit second packet sequencing data to the eNB 318 identifying at least data transmissions from the eNB 318 to the serving node that had been received by the serving node and which have not been received by the UE 106. The first packet sequencing data and packet data associated with the second packet sequencing data is then transmitted to the target node to facilitate the target node in transmitting the packet data associated with the second packet sequencing data to the UE 106.

The eNB 318 can stop the packet duplication procedure by performing a packet duplication release operation when the appropriate target node receives an "End marker." For example, if the appropriate target node is the eNB 318, the eNB 318 stops the packet duplication procedure and sends the data packets to the new destination. For another example, if the appropriate target node is a destination other than the eNB 318, such as the RN2 104*b*, the RN2 104*b* transmits a "Packet Duplication release" message to the eNB 318. The eNB 318 then stops the packet duplication procedure and sends the data packets to a new destination.

The aPD and vPD procedures described above can avoid the extra latency that may occur during a handoff as a result of the late packets being sent back by the RN1 104a through the eNB 102 via the Un interface. It should be noted, however, that when the vPD procedure is being used and the UE 106 is dropped as discussed above, the transmission of the stored packets by the eNB 318 may introduce a delay of one DL transmission period in addition to a "failure notice" delivery time, with probability of the failure.

Figure 8:
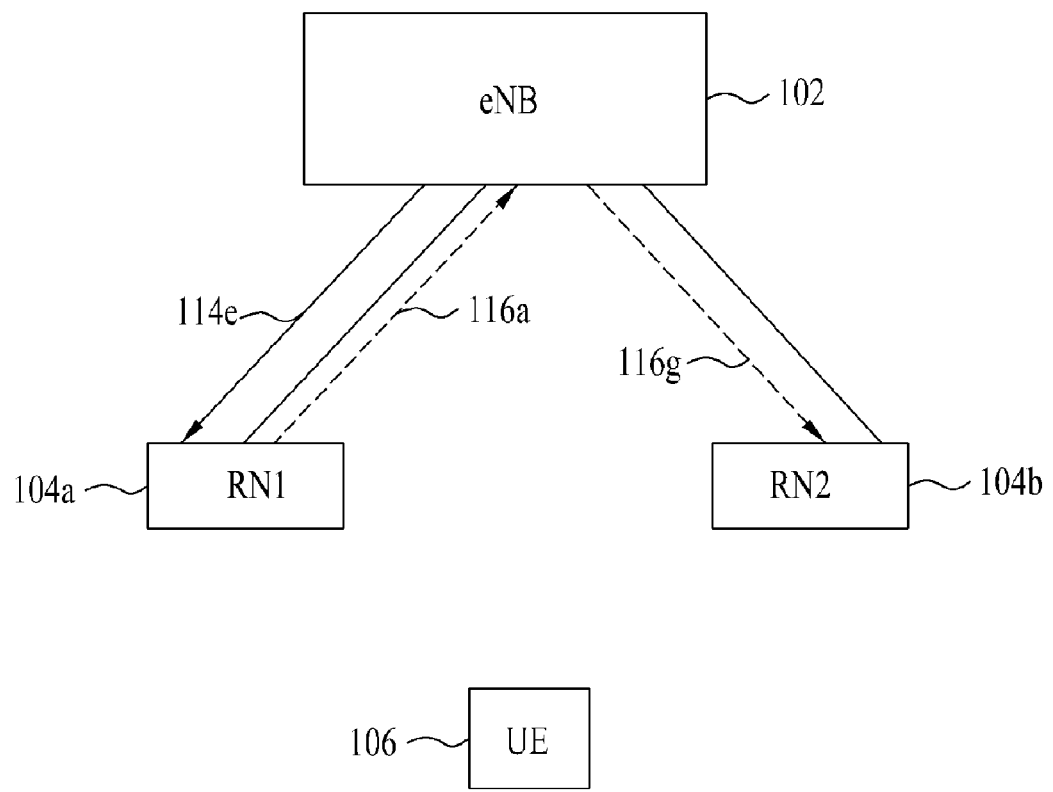
FIG. 8 depicts the network structure of a typical E-UTRAN.

As shown in FIGS. 6 and 7, the aPD and vPD procedures enable the use of fewer radio resources than the handoff procedure used by the network structure 100. For example, as shown in FIG. 8, the transmission of the late data packets from the eNB 102 to the RN1 104a as indicated by arrow 114e, the return transmission of the late data packets from the RN1 104a to the eNB 102 as indicated by arrow 116a, and the transmission of the late data packets from the eNB 102 to the RN2 104b requires radio resources for three transmissions, that is, one UL transmission and two DL transmissions. In some embodiments, eNB 102 may be configured in a manner similar the eNBs 318 disclosed herein.

In contrast, when performing the aPD procedure as shown in FIG. 6, the eNB 318 requires radio resources for two transmissions, that is, the two DL transmissions indicated by arrows 350 and 352. As another example, when performing the vPD procedure as shown in FIG. 7, the eNB 318 requires radio resources for one transmission, that is, the DL transmission as indicated by arrow 354.

Figure 9:
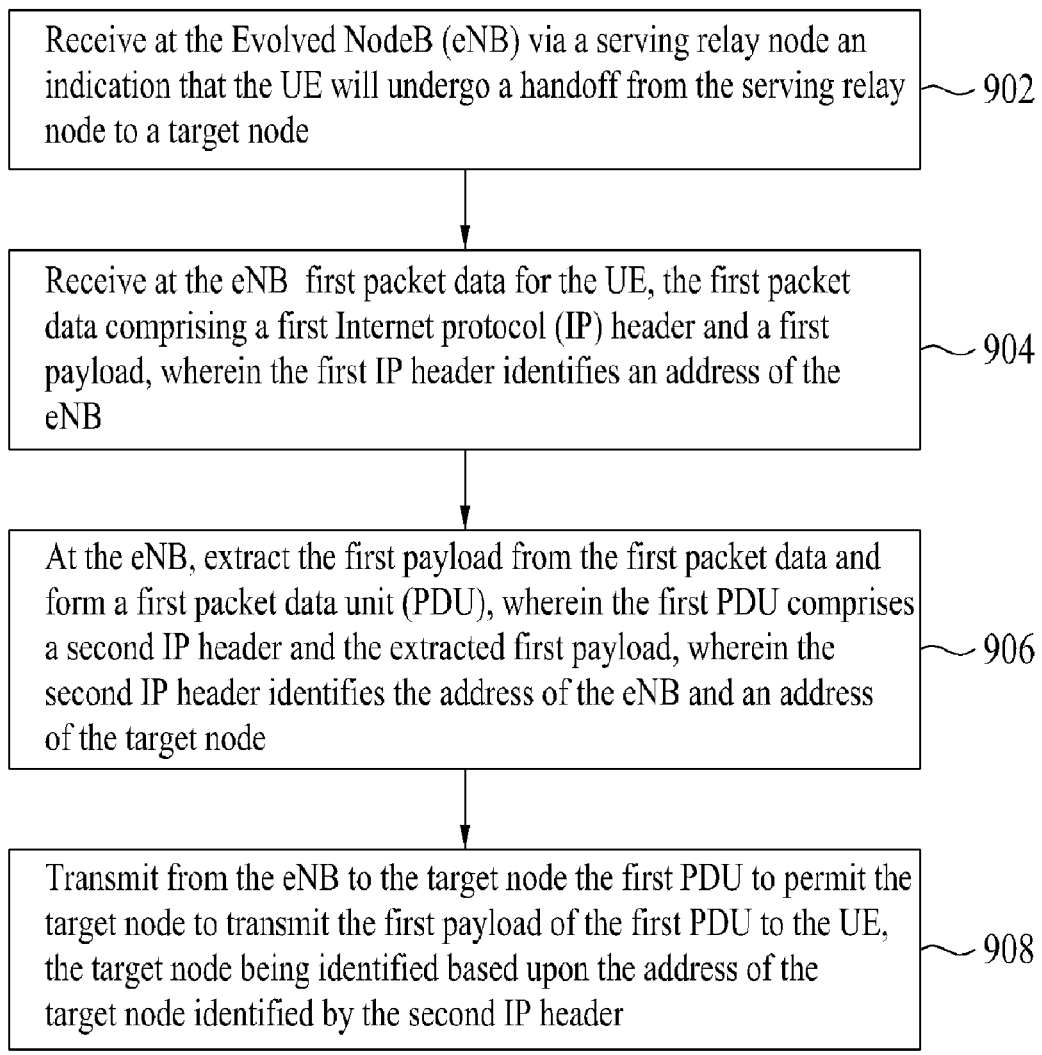
FIG. 9 is a flow chart of a method for facilitating UE handoff within a packet communication system according to an exemplary embodiment of the invention.

FIG. 9 is a flow chart of a method for facilitating UE handoff within a packet communication system according to an exemplary embodiment of the present invention.

As shown in FIG. 9, the eNB receives via a serving relay node an indication that the UE 106 will undergo a handoff from the serving relay node to a target node (S902). The eNB receives first packet data for the UE 106, the first packet data including a first Internet protocol (IP) header and a first payload, where the first IP header identifies an address of the eNB 318 (S904).

The eNB 318 extracts the first payload from the first packet data and forms a first packet data unit (PDU), where the first PDU includes a second IP header and the extracted first payload and where the second IP header identifies the address of the eNB 318 and an address of the target node (S906).

The eNB 318 transmits to the target node the first PDU to permit the target node to transmit the first payload of the first PDU to the UE 106, the target node being identified based upon the address of the target node identified by the second IP header (S908).

Figure 10:
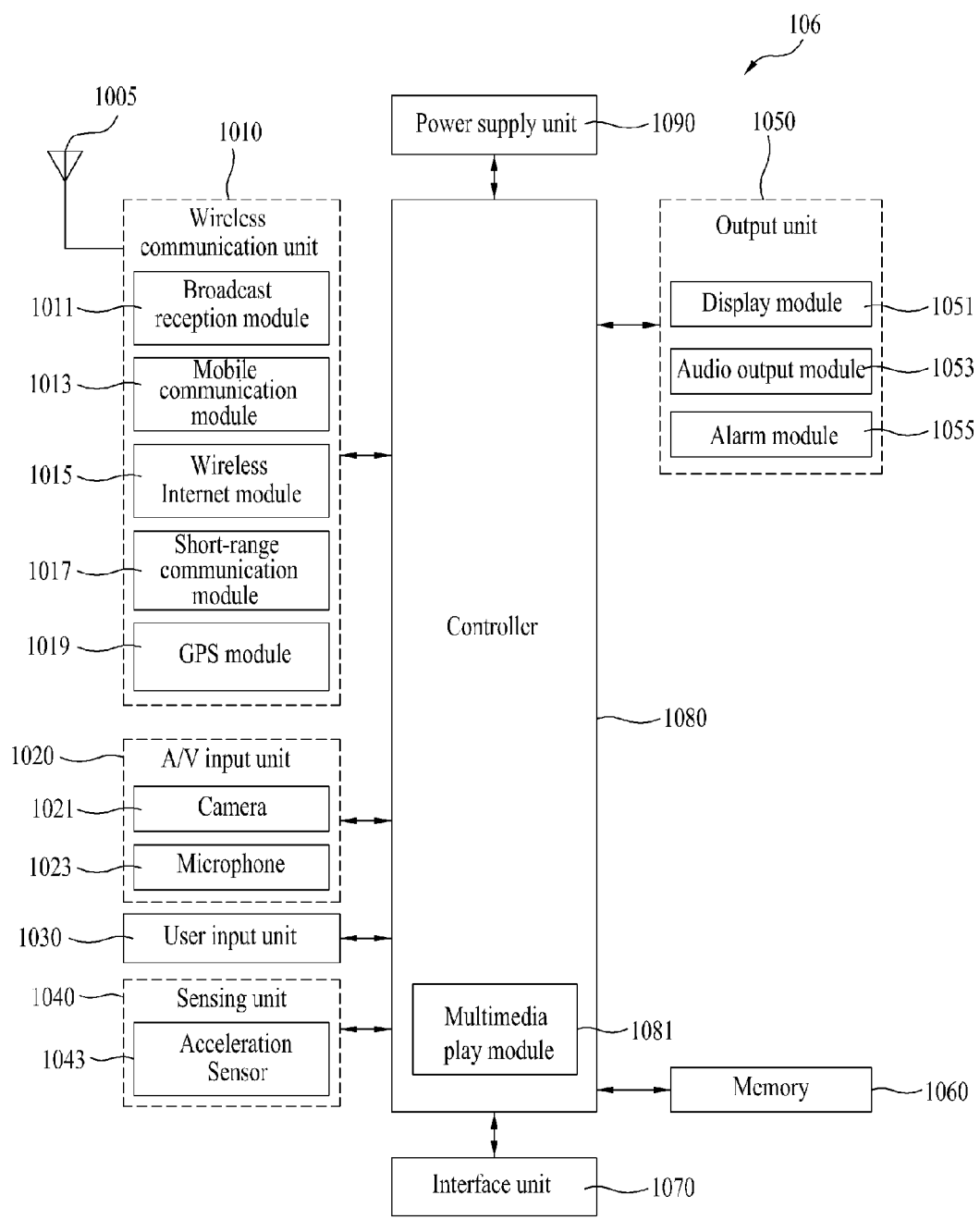
FIG. 10 is a block diagram showing in more detail various components which may be implemented in the UE according to various embodiment of the invention.

FIG. 10 is a block diagram showing in more detail various components which may be implemented in UE 106 according to various embodiment of the present invention. It is understood that greater or fewer components than those shown may be implemented.

Referring to FIG. 10, the UE 106 may include a wireless communication unit 1010, an audio/video (A/V) input unit 1020, a user input unit 1030, a sensing unit 1040, an output unit 1050, a memory 1060, an interface unit 1070, a controller 1080, and a power supply unit 1090. Two or more of the wireless communication unit 1010, the AN input unit 1020, the user input unit 1030, the sensing unit 1040, the output unit 1050, the memory 1060, the interface unit 1070, the controller 1080, and the power supply unit 1090 may be incorporated into a single unit, or some of the wireless communication unit 1010, the A/V input unit 1020, the user input unit 1030, the sensing unit 1040, the output unit 1050, the memory 1060, the interface unit 1070, the controller 1080, and the power supply unit 1090 may be divided into two or more smaller units.

The wireless communication unit 1010 may include a broadcast reception module 1011, a mobile communication module 1013, a wireless Internet module 1015, a short-range communication module 1017, and a GPS module 1019.

The broadcast reception module 1011 receives a broadcast signal and/or broadcast-related information from an external broadcast management server through a broadcast channel. Examples of a broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to UE 106 through a mobile communication network. In this case, the broadcast-related information may be received by the mobile communication module 1013, rather than by the broadcast reception module 1011. The broadcast-related information may come in various forms, for example, electronic program guide (EPG) of digital multimedia broadcasting (DMB) or electronic service guide (ESG) of digital video broadcast-handheld (DVB-H).

Broadcast reception module 1011 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 1011 may be configured to be suitable for nearly all types of broadcasting systems other than those set forth herein.

The broadcast signal and/or the broadcast-related information received by the broadcast reception module 1011 may be stored in memory 1060.

The mobile communication module 1013 transmits wireless signals to or receives wireless signals from at least one or more of a base station, an external station, and a server through a mobile communication network. The wireless signals may include various types of data according to whether the UE 106 transmits/receives voice call signals, video call signals, or text/multimedia messages.

The wireless Internet module 1015 may be a module for wirelessly accessing the Internet. The wireless Internet module 1015 may be embedded in the UE 106 or may be installed in an external device.

The short-range communication module 1017 may be a module for short-range communication. The short-range communication module 1017 may use various short-range communication techniques such as Bluetooth®, radio frequency identification (RFID), infrared data association (IrDA), ultra wideband (UWB), and ZigBee®.

The GPS module 1019 may receive position information from one or more satellites (e.g., GPS satellites).

The A/V input unit 1020 may be used to receive audio signals or video signals. The A/V input unit 1020 may include one or more cameras 1021 and a microphone 1023. The camera 1021 processes various image frames such as still images or moving images captured by an image sensor during a video call mode or an image capturing mode. The image frames processed by the camera 1021 may be displayed by a display module 1051.

The image frames processed by the camera 1021 may be stored in the memory 1060 or may be transmitted outside the UE 106 through the wireless communication unit 1010. The UE 106 may include more than two cameras.

The microphone 1023 receives external sound signals during a call mode, a recording mode, or a voice recognition mode with the use of a microphone and converts the sound signals into electrical sound data. In the call mode, the mobile communication module 1013 may convert the electrical sound data into data that can be readily transmitted to a mobile communication base station and then output the data obtained by the conversion. The microphone 1023 may use various noise removal algorithms to remove noise that may be generated during the reception of external sound signals.

The user input unit 1030 generates key input data based on user input for controlling the operation of the UE 106. The user input unit 1030 may be implemented as a keypad, a dome switch, a touch pad (either static pressure or constant electricity), a jog wheel, or a jog switch. In particular, if the user input unit 1030 is implemented as a touch pad and forms a mutual layer structure along with the display module 1051, the user input unit 1030 and the display module 1051 may be collectively referred to as a touch screen.

The sensing unit 1040 determines a current state of the UE 106 such as whether the UE 106 is opened or closed, the position of the UE 106 and whether the UE 106 is placed in contact with a user. In addition, the sensing unit 1040 generates a sensing signal for controlling the operation of the UE 106.

For example, when the UE 106 is a slider-type mobile phone, the sensing unit 1040 may determine whether the UE 106 is opened or closed. In addition, the sensing unit 1040 may determine whether the UE 106 is powered by the power supply unit 1090 and whether the interface unit 1070 is connected to an external device.

The sensing unit 1040 may include an acceleration sensor 1043. Acceleration sensors are a type of device for converting an acceleration variation into an electric signal. With recent developments in micro-electromechanical system (MEMS) technology, acceleration sensors have been widely used in various products for various purposes. For example, an acceleration sensor may be used as an input device for a computer game and may sense the motion of the human hand during a computer game.

Two or three acceleration sensors 1043 representing different axial directions may be installed in the UE 106. Alternatively, only one acceleration sensor 1043 representing a Z axis may be installed in the UE 106.

The output unit 1050 may output audio signals, video signals, and alarm signals. The output unit 1050 may include the display module 1051, an audio output module 1053, and an alarm module 1055.

The display module 1051 may display various information processed by the UE 106. For example, if the UE 106 is in a call mode, the display module 1051 may display a user interface (UI) or a graphical user interface (GUI) for making or receiving a call. If the UE 106 is in a video call mode or an image capturing mode, the display module 1051 may display a UI or a GUI for capturing or receiving images.

If the display module 1051 and the user input unit 1030 form a mutual layer structure and are thus implemented as a touch screen, the display module 1051 may be used not only as an output device but also as an input device. If the display module 1051 is implemented as a touch screen, the display module 1051 may also include a touch screen panel and a touch screen panel controller.

The touch screen panel is a transparent panel attached onto the exterior of the UE 106 and may be connected to an internal bus of the UE 106. The touch screen panel monitors whether the touch screen panel is touched by a user. Once a touch input to the touch screen panel is detected, the touch screen panel transmits a number of signals corresponding to the touch input to the touch screen panel controller.

The touch screen panel controller processes the signals transmitted by the touch screen panel and transmits the processed signals to the control unit 1080. The control unit 1080 then determines whether a touch input has been generated and which part of the touch screen panel has been touched based on the processed signals transmitted by the touch screen panel controller.

As described above, if the display module 1051 and the user input unit 1030 form a mutual layer structure and are thus implemented as a touch screen, the display module 1051 may be used not only as an output device but also as an input device. The display module 1051 may include at least one of a liquid crystal display (LCD), a thin film transistor (TFT)-LCD, an organic light-emitting diode (OLED), a flexible display, and a three-dimensional (3D) display.

The UE 106 may include two or more display modules 1051. For example, the UE 106 may include an external display module and an internal display module.

The audio output module 1053 may output audio data received by the wireless communication unit 1010 during a call reception mode, a call mode, a recording mode, a voice recognition mode, or a broadcast reception mode or may output audio data present in the memory 1060. In addition, the audio output module 1053 may output various sound signals associated with the functions of the UE 106 such as receiving a call or a message. The audio output module 1053 may include a speaker and a buzzer.

The alarm module 1055 may output an alarm signal indicating the occurrence of an event in the UE 106. Examples of the event include receiving a call signal, receiving a message, and receiving a key signal. Examples of the alarm signal output by the alarm module 1055 include an audio signal, a video signal, and a vibration signal.

The alarm module 1055 may output a vibration signal upon receiving a call signal or a message. In addition, the alarm module 1055 may receive a key signal and may output a vibration signal as feedback to the key signal.

Once a vibration signal is output by the alarm module 1055, the user may recognize that an event has occurred. A signal for notifying the user of the occurrence of an event may be output by the display module 1051 or the audio output module 1053.

The memory 1060 may store various programs necessary for the operation of the controller 1080. In addition, the memory 1060 may temporarily store various data such as a phonebook, messages, still images, or moving images.

The memory 1060 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The UE 106 may operate a web storage, which performs the functions of the memory 1060 on the Internet.

The interface unit 1070 may interface with an external device that can be connected to the UE 106. The interface unit 1070 may be a wired/wireless headset, an external battery charger, a wired/wireless data port, a card socket such as for a memory card or a subscriber identification module (SIM)/user identity module (UIM) card, an audio input/output (I/O) terminal, a video I/O terminal, or an earphone.

The interface unit 1070 may receive data from an external device or may be powered by an external device. The interface unit 1070 may transmit data provided by an external device to other components in the UE 106 or may transmit data provided by other components in the UE 106 to an external device.

The controller 1080 may control the general operation of the UE 106. For example, the controller 1080 may perform various control operations regarding making/receiving a voice call, transmitting/receiving data, or making/receiving a video call.

The controller 1080 may include a multimedia play module 1081, which plays multimedia data. The multimedia play module 1081 may be implemented as a hardware device and may be installed in the controller 1080. Alternatively, the multimedia play module 1081 may be implemented as a software program.

The power supply unit 1090 is supplied with power by an external power source or an internal power source and supplies power to other components in the UE 106. In alternative implementations, certain logic operations may be performed in a different order, modified or removed and still implement preferred embodiments of the present invention. Moreover, operations may be added to the above described logic and still conform to assorted implementations of the invention.

Furthermore, the described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may include a transmission media, such as a network transmission line, wireless transmission media, signals propagating through space, radio waves, infrared signals, etc. Of course, those skilled in the art will recognize that many modifications may be made to this configuration, and that the article of manufacture may comprise any information bearing medium known in the art.

The logic implementation shown in the figures describe specific operations as occurring in a particular order. In alternative implementations, certain logic operations may be performed in a different order, modified or removed and still implement certain embodiments of the present invention. Moreover, operations may be added to the above described logic and still conform to the described implementations. The foregoing embodiments and advantages are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method to facilitate user equipment (UE) handoff within a packet data communication system, the method comprising:
   receiving at the Evolved NodeB (eNB) via a serving relay node an indication that the UE will undergo a handoff from the serving relay node to a target node;
   receiving at the eNB first packet data for the UE, the first packet data comprising a first Internet protocol (IP) header and a first payload, wherein the first IP header identifies an address of the eNB;
   extracting, at the eNB, the first payload from the first packet data to form a first packet data unit (PDU), wherein the first PDU comprises a second IP header and the extracted first payload, wherein the second IP header identifies the address of the eNB and an address of the target node; and
   transmitting, from the eNB to the target node, the first PDU to permit the target node to transmit the first payload of the first PDU to the UE, the target node being identified based upon the address of the target node identified by the second IP header.

2. The method according to claim 1, further comprising:
   identifying that second packet data for the UE has been received at the eNB during a time period when the UE is undergoing the handoff to the target node.

3. The method according to claim 2, further comprising:
   extracting, at the eNB, a second payload from the second packet data to form a second PDU, wherein the second PDU comprises a third IP header and the extracted second payload, wherein the third IP header identifies the address of the eNB and an address of the target node;
   extracting, at the eNB, the second payload from the second packet data to form a third PDU, wherein the third PDU comprises a fourth IP header and the extracted second payload, wherein the fourth IP header identifies the address of the eNB and an address of the serving relay node;
   transmitting the second packet data to the target node; and
   transmitting the third packet data to the serving relay node.

4. The method according to claim 2, further comprising:
   extracting, at the eNodeB, the second payload from the second packet data to form a second PDU, wherein the second PDU comprises a third IP header and the extracted second payload, wherein the third IP header identifies the address of the eNB and an address of the target node; and
   transmitting the second PDU to the target node via a via a lower protocol layer.

5. The method according to claim 1, further comprising:
   receiving at the eNB first packet sequencing data relating to latest packet data transmissions from the serving relay node to the UE for which the UE has not yet received;
   providing the first packet sequencing data to the target node to facilitate packet data transmissions from the target node to the UE;
   receiving at the eNB from the serving relay node second packet sequencing data identifying at least data transmissions from the eNB to the serving relay node which have not been received by the UE; and
   transmitting the first packet sequencing data and packet data associated with the second packet sequencing data to the target node to facilitate the target node in transmitting the packet data associated with the first packet sequencing data to the UE.

6. The method according to claim 2, further comprising:
receiving at the eNB packet sequencing data relating to latest packet data transmissions from the serving relay node to the UE for which the UE has not yet received; and
providing the packet sequencing data to the target node to facilitate packet data transmissions from the target node to the UE.

7. The method according to claim 1, further comprising:
extracting, at the target node, the first payload from the first PDU to form a second PDU, wherein the second PDU comprises the extracted first payload from the first PDU; and
transmitting from the target node to the UE the second PDU.

8. The method according to claim 1, wherein a control plane of the packet data communication system comprises a Radio Resource Control Lite (RRC-Lite) end-to-end protocol.

9. The method according to claim 1, further comprising:
receiving, at the eNB, the first packet data from a serving gateway (S-GW).

10. The method according to claim 1, further comprising receiving the first packet data from a mobility management entity (MME).

11. The method according to claim 1, further comprising receiving handoff related data from the UE at the eNB via the serving rely node, the handoff related data enabling determination of the handoff of the UE from the serving relay node to the target node.

12. The method according to claim 1, wherein the first payload comprises a data portion of a general packet radio service tunneling protocol (GTP) data unit or a data portion of a Stream Control Transmission Protocol (SCTP) data unit.

13. The method according to claim 3, wherein the first and second payloads each comprise a data portion of a general packet radio service tunneling protocol (GTP) data unit or a data portion of a Stream Control Transmission Protocol (SCTP) data unit.

14. The method according to claim 4, wherein the first and second payloads each comprise a data portion of a general packet radio service tunneling protocol (GTP) data unit or a data portion of a Stream Control Transmission Protocol (SCTP) data unit.

15. The method according to claim 7, wherein the first payload comprises a data portion of a general packet radio service tunneling protocol (GTP) data unit or a data portion of a Stream Control Transmission Protocol (SCTP) data unit.

16. The method according to claim 1, wherein the target node is a relay node or an eNB.

17. The method according to claim 1, wherein the eNB is in communication with the serving relay node via an S1 interface.

18. The method according to claim 9, wherein the eNB is in communication with the S-GW via an S1-U interface.

19. The method according to claim 9, wherein the S-GW receives the first packet data from a packet data network gateway (P-GW) via an S5 or S8 interface.

20. The method according to claim 1, wherein the UE is in communication with the serving relay node via a Uu interface.

21. The method according to claim 1, wherein a user plane of the packet data communication system comprises a Packet Data Convergence Protocol Lite (PDCP-Lite) end-to-end protocol between the UE and the eNB to avoid mapping between a first packet sequencing data relating to latest packet data transmissions from the serving relay node to the UE for which the UE has not yet received and second packet sequencing data identifying at least data transmissions from the eNB to the serving relay node which have not been received by the UE during handover.

22. A method to facilitate user equipment (UE) handoff within a packet data communication system, the method comprising:
receiving, at the eNB via a serving relay node, an indication that the UE will undergo a handoff from the serving relay node to a target node;
receiving, at the eNB, first packet data for the UE, the first packet data comprising a first Internet protocol (IP) header and a first payload, wherein the first IP header identifies an address of the eNB;
extracting, at the eNB, the first payload from the first packet data to form a first packet data unit (PDU), wherein the first PDU comprises the extracted first payload;
transmitting, from the eNB to the target node, the first PDU to permit the target node to transmit the first payload of the first PDU to the UE;
identifying second packet data for the UE that has been received at the eNB, the second packet data being received at the eNB after the first packet data is received at the eNB, and which the second packet data is received during a time period when the UE is undergoing the handoff to the target node;
extracting, at the eNB, the second payload from the second packet data to form a second PDU, wherein the second PDU comprises the extracted second payload from the second packet data;
extracting, at the eNB, the second payload from the second packet data to form a third PDU, wherein the third PDU comprises the extracted second payload from second packet data;
transmitting the second PDU to the target node via a lower protocol layer; and
transmitting the third PDU to the serving relay node via the lower protocol layer.

23. The method according to claim 22, further comprising:
receiving at the eNB first packet sequencing data relating to latest packet data transmissions from the serving relay node to the UE for which the UE has not yet received;
providing the first packet sequencing data to the target node to facilitate packet data transmissions from the target node to the UE;
receiving at the eNB from the serving relay node second packet sequencing data identifying at least data transmissions from the eNB to the serving relay node which have not been received by the UE; and
transmitting the first packet sequencing data and packet data associated with the second packet sequencing data to the target node to facilitate the target node in transmitting the packet data associated with the first packet sequencing data to the UE.

\* \* \* \* \*